(12) United States Patent
Fidali et al.

(10) Patent No.: US 7,757,998 B1
(45) Date of Patent: Jul. 20, 2010

(54) COMPUTER MOUSE ACCOUTREMENT (ATTACHMENT) AND METHOD OF PREVENTING OR ALLEVIATING CARPEL TUNNEL SYNDROME (CTS)

(75) Inventors: Wlodzimierz Fidali, Brooklyn, NY (US); Robert T. Logan, New York, NY (US)

(73) Assignee: Senduzy Corp., New York, NY (US)

( * ) Notice: Subject to any disclaimer, the term of this patent is extended or adjusted under 35 U.S.C. 154(b) by 0 days.

(21) Appl. No.: 12/637,518

(22) Filed: Dec. 14, 2009

(51) Int. Cl.
*B68G 5/00* (2006.01)
*A47G 29/00* (2006.01)
*G09G 5/08* (2006.01)

(52) U.S. Cl. .................. 248/118; 248/686; 345/163

(58) Field of Classification Search ............. 248/118.1, 248/118.3, 118.5; 345/163
See application file for complete search history.

(56) References Cited

U.S. PATENT DOCUMENTS

| | | | |
|---|---|---|---|
| 5,131,614 A | | 7/1992 | Garcia |
| 5,433,407 A | | 7/1995 | Rice |
| 5,788,195 A | * | 8/1998 | Rice .................. 248/118.5 |
| 5,913,497 A | * | 6/1999 | Myers ................ 248/118.5 |
| 6,431,504 B1 | * | 8/2002 | Ignagni ............... 248/118.5 |
| D494,590 S | * | 8/2004 | Richter ................... D14/393 |
| 7,025,310 B2 | * | 4/2006 | Bouchard ............... 248/118 |
| 2003/0169236 A1 | * | 9/2003 | Crocker ................ 345/168 |

\* cited by examiner

*Primary Examiner*—J. Allen Shriver, II
*Assistant Examiner*—Erin Smith
(74) *Attorney, Agent, or Firm*—American Pioneer Ventures; Daniar Hussain

(57) ABSTRACT

A new ergonomic accoutrement adapted to be attached to a computer mouse was developed to prevent strain injuries to the hand and wrist and prevent or alleviate the symptoms associated with Carpel Tunnel Syndrome (CTS) for those who are repetitive users of computer mouse devices. The accoutrement is designed to leave the carpal tunnel of the user of a computer mouse substantially open, thus precluding tunnel narrowing and the symptoms resulting therefrom. The accoutrement is also designed to maximize comfort of the user, alleviate wrist bend associated with use of the mouse, and be adaptable to different size hands.

17 Claims, 16 Drawing Sheets

COMPUTER MOUSE ACCOUTREMENT (ATTACHMENT) AND METHOD OF PREVENTING OR ALLEVIATING CARPEL TUNNEL SYNDROME (CTS)

BACKGROUND

The carpal tunnel is a narrow tunnel in the wrist formed by ligament and bone. Passing through the carpal tunnel is the median nerve, which carries impulses from the brain into the hand. Tendons in the hand which enable the hand to close also pass through the carpal tunnel. These tendons, when stressed, swell inside the carpal tunnel and compress the median nerve. Compression of the median nerve leads to numbness or weakness of the hand. Ultimately, if not treated, theses systems lead to carpal tunnel syndrome (CTS). CTS may be caused by a variety of factors. Activities that require the wrist to remain in extended, flexed or exaggerated positions for significant periods of time may lead to CTS.

The symptoms of CTS are a tingling, numbness of the hand between the thumb and part of the ring finger accompanied by pain that travels up the forearm from the wrist. There is a potential of permanent numbness and limited movement of the fingers associated with CTS. Subsequent treatment requires a splint to be worn about the wrist, cortisone injections and in some cases operations to relieve the pain.

CTS has become an increasingly significant problem as computers have become a mainstay in the home and in the office environment. Repetitive use of the computer mouse and other input devices has added to the problem. Handed versions of the mouse are designed specifically to the contours of either the right or the left hand. In use, the palm of the hand caresses the mouse with the Carpal Tunnel part of the hand squeezed in place by the flesh below the thumb ("Thenar Eminence") and the flesh below the pinky ("Hypthenar Eminence"). Continued use of the mouse in this position causes the Carpal Tunnel to become very narrow which inflames tissues which then press against nerves which in turn cause pain, numbness and weakness, often resulting in CTS. Additionally, if a mouse, trackball or other input device is placed too far away, too high, too low, or too much on one side from the user the position can cause shoulder, wrist, elbow and forearm discomfort. Repetitive movement of the shoulder and arm often results in posture related problems other than CTS.

It has been postulated that improper wrist posture when using a computer keyboard or mouse has contributed towards the development of CTS. If the keyboard or mouse is placed on a flat surface such as a table, the user's wrist will be bent. Such bending of the wrist places significant stress on the wrist muscles. Solutions to mitigate wrist bending while using a mouse are known in the art. For example, U.S. Pat. No. 5,131,614 to Garcia discloses a wrist support for alleviating stress-related problems associated with the use of a computer mouse. U.S. Pat. No. 7,025,310 to Bouchard discloses a hand and wrist support device to be used with a mouse. The device is designed to allow operation of the mouse with the user's fingers with hand and wrist positioned on the device remaining on a horizontal plane, stationary and relaxed. In use, the user's wrist rests on an elevated surface that is adapted to accommodate the mouse.

U.S. Pat. No. 5,433,407, to Rice, which is incorporated by reference, also discloses an attachment to be used with a mouse that alleviates posture- and stress-related disorders associated with use of a mouse. The attachment described in U.S. Pat. No. 5,433,407 is a curved-shape palm rest that has a back and top portion and side walls. The walls form a cavity which is able to accept a portion of the mouse. The user's palm is placed on the palm rest which allows the fingers to control the attached mouse. According to U.S. Pat. No. 5,433,407, this position encourages an essentially straight path between the elbow, wrist and hand of the user, hence reducing wrist bend and stress to the carpal tunnel.

Accordingly, prior art methods of reducing CTS associated with the use of a mouse or other input device have relied on supporting the palm, wrist, forearm and/or shoulder to alleviate stress which is supposed to result is less fatigue. While the prior art methods have partially succeeded in alleviating or delaying symptoms associated with CTS, they have not addressed the underlying problem, that is, keeping the carpal tunnel open. In prior art methods described above, the palm is in direct contact with the 'free' mouse or the mouse attachment. For instance, in U.S. Pat. No. 5,433,407, the disclosed palm rest has a curvilinear upper section where the user rests his or her palm. The design allows the user's hand to conform to the shape of the palm rest. However, such a configuration provides little or no space between the palm of the hand and the palm rest. Moreover, as discussed with respect to the 'free' mouse, the carpal tunnel part of the hand in direct contact with the palm rest is squeezed in place, resulting in significant tunnel narrowing, ultimately leading to CTS and other posture related problems.

Thus, what is needed is a means of significantly alleviating or eliminating CTS and other stress-related disorders resulting from the use of a computer mouse and other input devices. The solution to the problem must be a device that is easy to use, comfortable, adaptable to various input devices, and addresses the underlying problems that result in CTS.

SUMMARY OF INVENTION

In accordance with these objectives, a new ergonomic accoutrement (attachment) adapted to be attached to a computer mouse has now been developed to prevent strain injuries to the hand and wrist and prevent or alleviate the symptoms associated with CTS for those who are repetitive users of computer mouse devices. The accoutrement is designed to leave the carpal tunnel of the user of a computer mouse substantially open, thus precluding tunnel narrowing and the symptoms resulting therefrom. The accoutrement is also designed to maximize comfort of the user, alleviate wrist bend associated with use of the mouse, and be adaptable to different size hands.

One aspect of the current invention is an accoutrement to a computer mouse that has two cushions adapted to fit in a receptacle, wherein the cushions have a small crevice there between which keeps the carpal tunnel of the user's hand substantially open.

Another aspect of the current invention is a method of reducing stress and posture related disorders associated with the use of a mouse, comprising:
  providing a receptacle containing a left cushion and a right cushion, said cushions collectively forming the shape of a human palm;
  placing a mouse within the interior of said receptacle such that the periphery of said mouse abuts said left and right cushions; and
  placing a hand on said cushions, wherein the carpal tunnel of said hand does not directly contact said cushions.

DETAILED DESCRIPTION OF INVENTION

This invention provides for an ergonomic accoutrement (attachment) to a computer mouse or other input device. The accoutrement is deigned to prevent strain injuries to the hand and wrist and to prevent the development of CTS for frequent users of the mouse.

Our design of the ergonomic accoutrement for a mouse began with some observations related to the natural, unstressed state of the carpal tunnel. We observed that space for the carpal tunnel is maintained when the hand is in a natural state. Conversely when the thumb and pinky finger come together the carpal tunnel is closed and if held in that position will eventually cause pain. Our review of the natural shape of the hand showed that the palm is being placed in an unnatural position by holding a computer mouse against the carpal tunnel. Use of a computer mouse requires the palm to caress the mouse to move the cursor on the screen. The cheeks of the palm (Abductor Digiti Minimi and Abductor Pollicis Bravis) are squeezed to the center reducing the space of the carpal tunnel.

Figure 1:
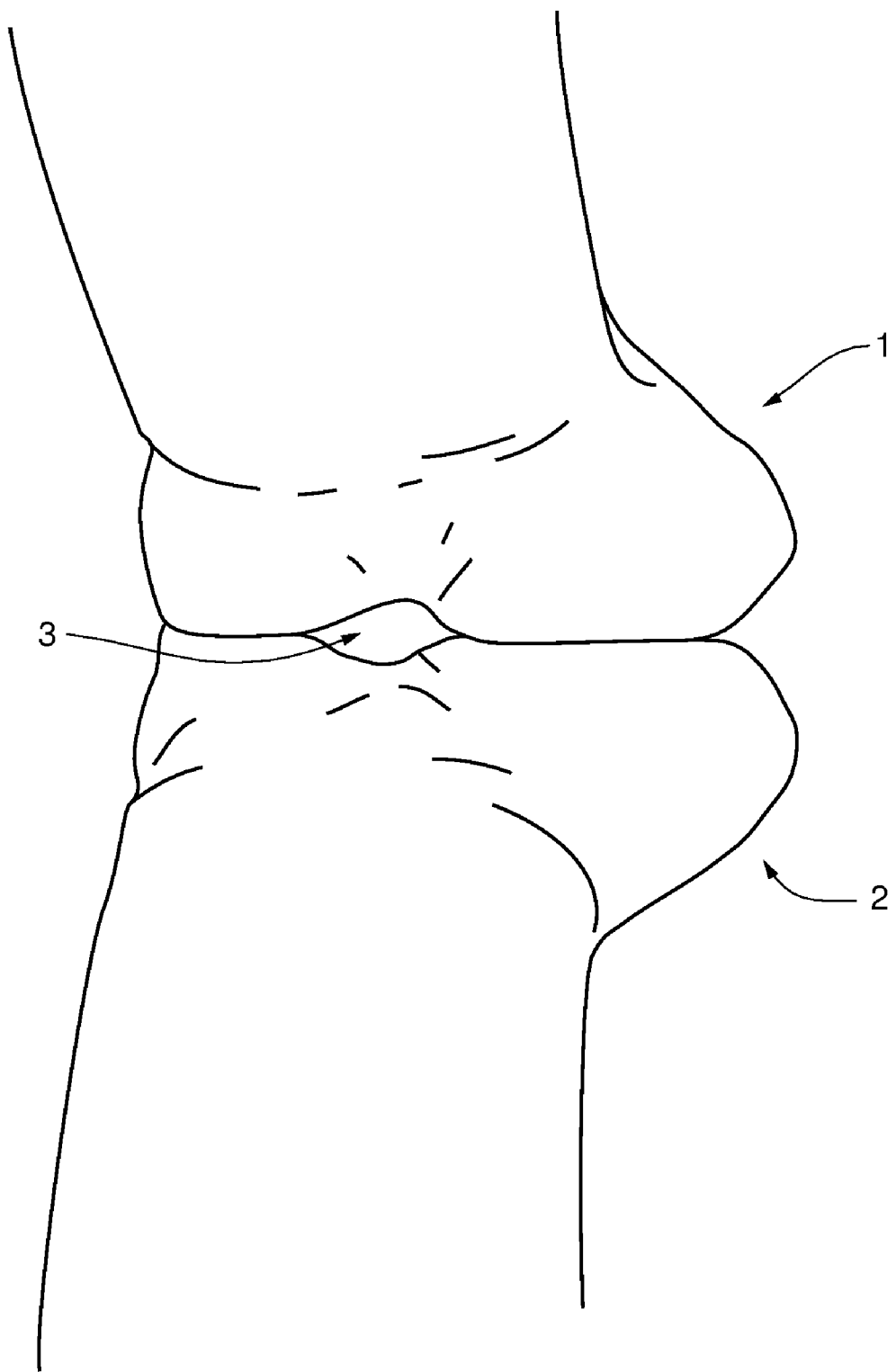
FIG. 1 illustrates the space created when two palms are clasped together.

The carpal tunnel should instead be maintained to keep it from squeezing onto itself, thus preventing tunnel narrowing. Hence, our design of the computer mouse accoutrement began with the premise that the space for the carpal tunnel must remain open while still providing the user with comfort and ease of use. Consequently, using nature as our motivation for developing a prototype, we recognized that placing the palms of the hands together (FIG. 1) effectively keeps the carpal tunnel sufficiently open and prevents the tunnel from squeezing onto itself. In FIG. 1, the palm of hand 1, when placed directly on top of the palm of hand 2 creates a space (3) between the two palms. Space 3 insures that the carpal tunnel of both hands 1 and 2 is left open, and thereby, does not come into contact with the other hand. Anatomically speaking, the cheeks of the palm of the lower hand 2, referred to as Abductor Digiti Minimi and Abductor Pollicis Bravis, act as cushions for the cheeks of the palm of the upper hand 1, thereby maintaining space 3 for the carpal tunnel. Assuming that hand 1 is the hand of the user of a computer mouse, the design of a mouse accoutrement that corresponds to the shape of the palm side of hand 2 would keep the carpal tunnel unexposed, thus eliminating tunnel narrowing.

Accordingly, one embodiment of the present invention is a computer mouse accoutrement that is designed to mimic the shape of the human palm. For example, referring again to FIG. 1, the shape of the accoutrement is designed to resemble the anatomy of the palm of hand 2, where hand 1 depicts the user's hand. When the hand of the user is placed on the accoutrement, the space for the carpal tunnel is maintained, preventing any squeezing of the tunnel which causes eventual damage to the hand, wrist and forearm.

Figure 2:
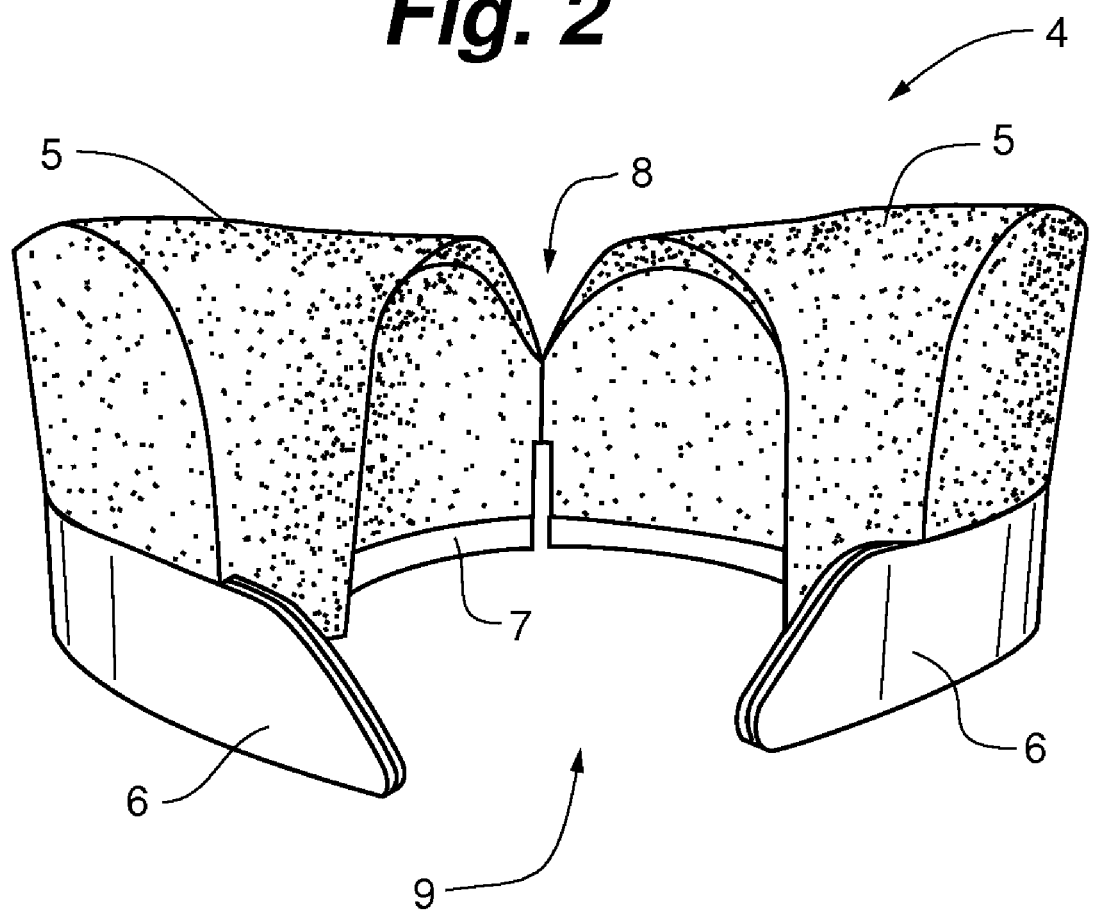
FIG. 2 illustrates a front view of the mouse accoutrement of the present invention.

FIG. 2 shows a preferred embodiment of the present invention. In FIG. 2, a front view of accoutrement 4 is shown. Accoutrement 4 has two cushions, 5, which are each adapted to fit into separate receptacles 6. The receptacles, when physically attached by a spring 7, create an open space (crevice) 8 directly between the two cushions 5. The space ranges from about three eighths of an inch to about seven eights of an inch. As will be discussed in greater detail below, the cushions are preferably designed to emulate the shape of the human palm. The hand of a user rests on cushions 5 and the center of the palm is essentially aligned with the open space 8 between the cushions. A cavity 9 is created by the two receptacles 6 holding cushions 5. Cavity 9 is adapted to accommodate a mouse or other input device.

Figure 3:
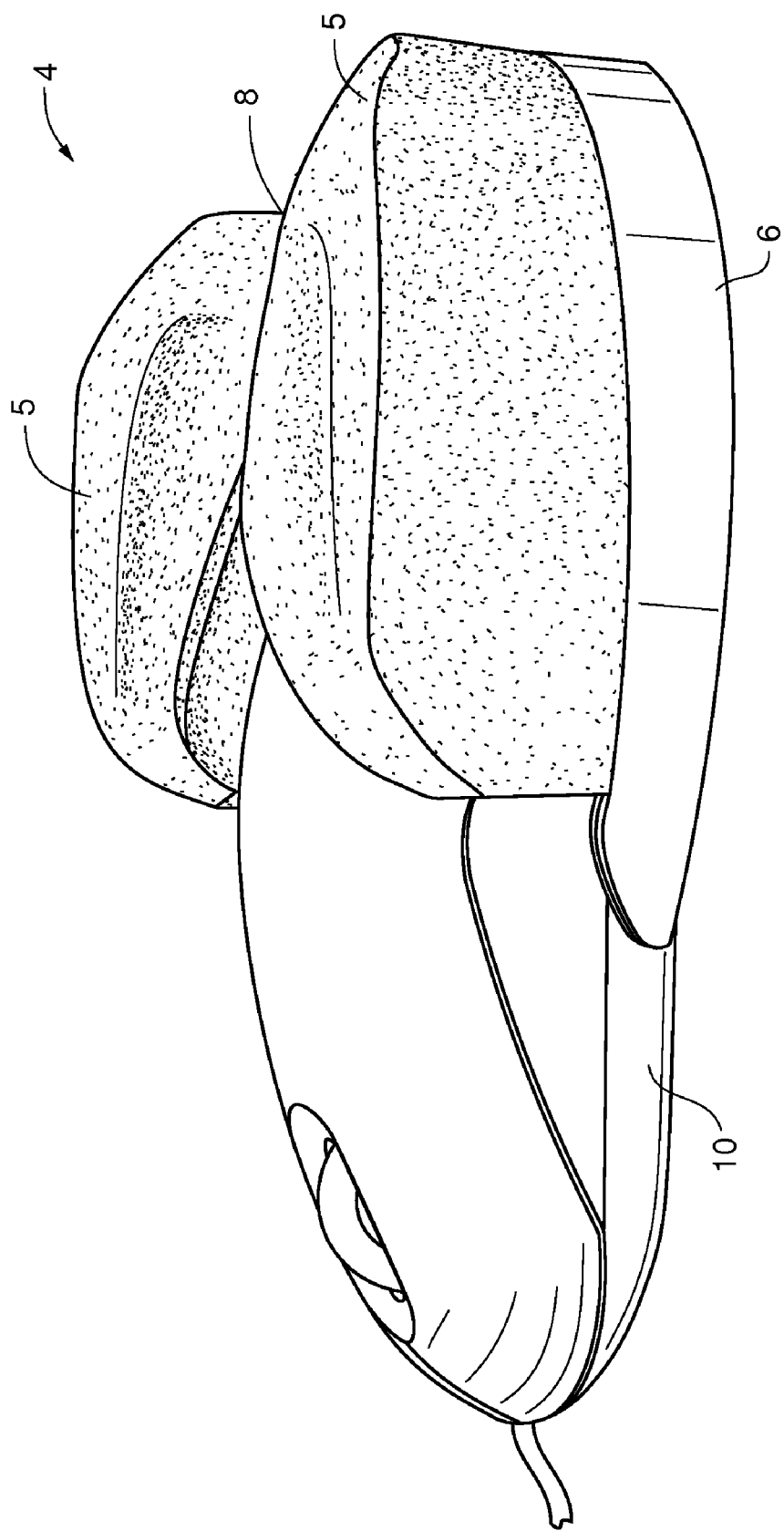
FIG. 3 illustrates a side view of the mouse accoutrement of the present invention with an attached mouse.
Figure 4:
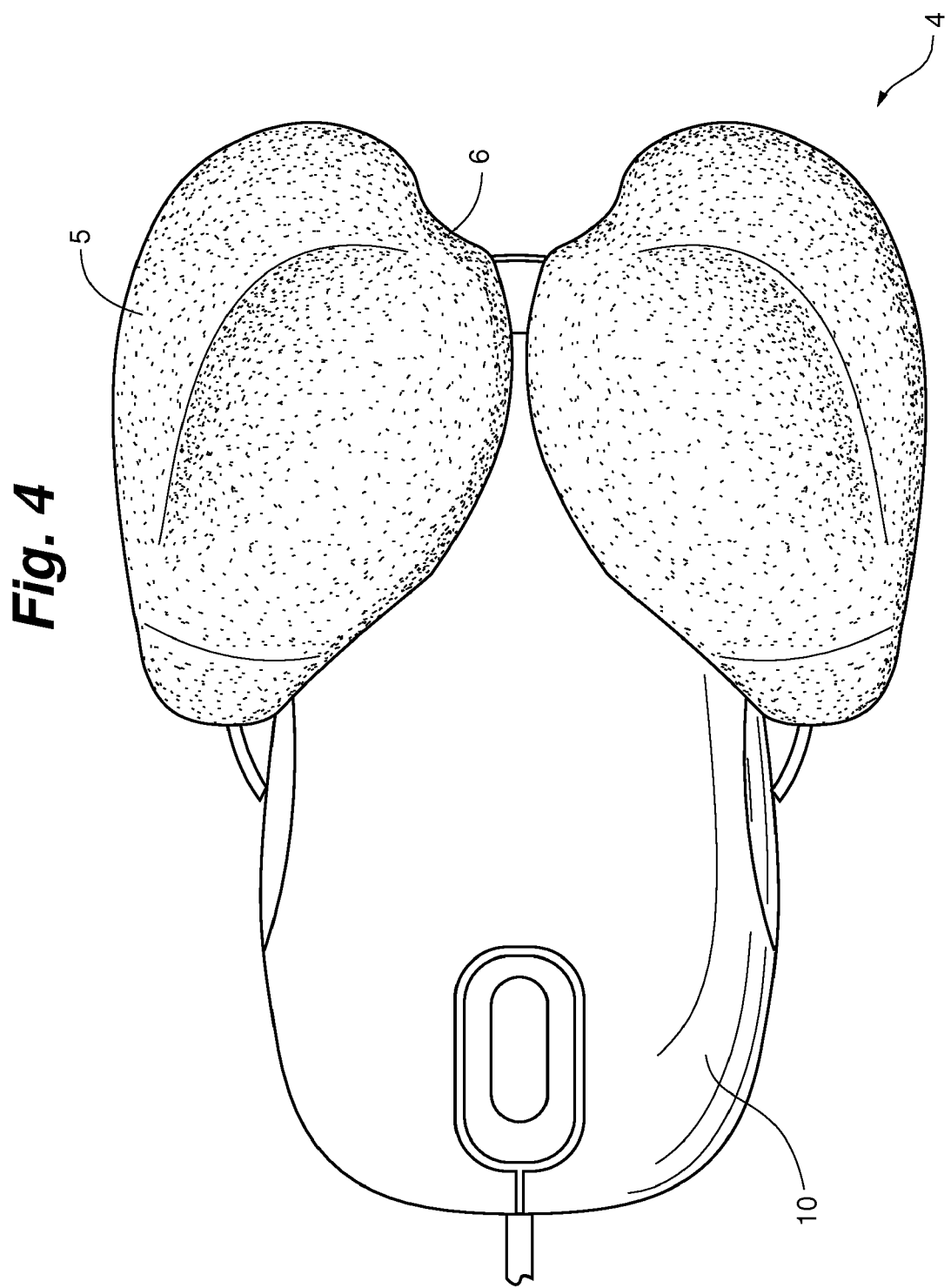
FIG. 4 illustrates a top view of the mouse accoutrement of the present invention with an attached mouse.

FIG. 3 depicts a side view of mouse accoutrement 4 with attached mouse 10. The mouse 10 fits directly into the cavity created by the two receptacles 6. The spring-like mechanism (not shown) holding the receptacles 6 together is flexible enough to accommodate computer mouse or input devices of varying sizes. The spring closes so that the receptacles 6 perfectly accommodate the mouse, with no space between the receptacles and the mouse. A top view of mouse 10 in accoutrement 4 is shown in FIG. 4. Here it can be seen that the walls of receptacle 6 abut the sides of attached mouse 10.

Figure 5:
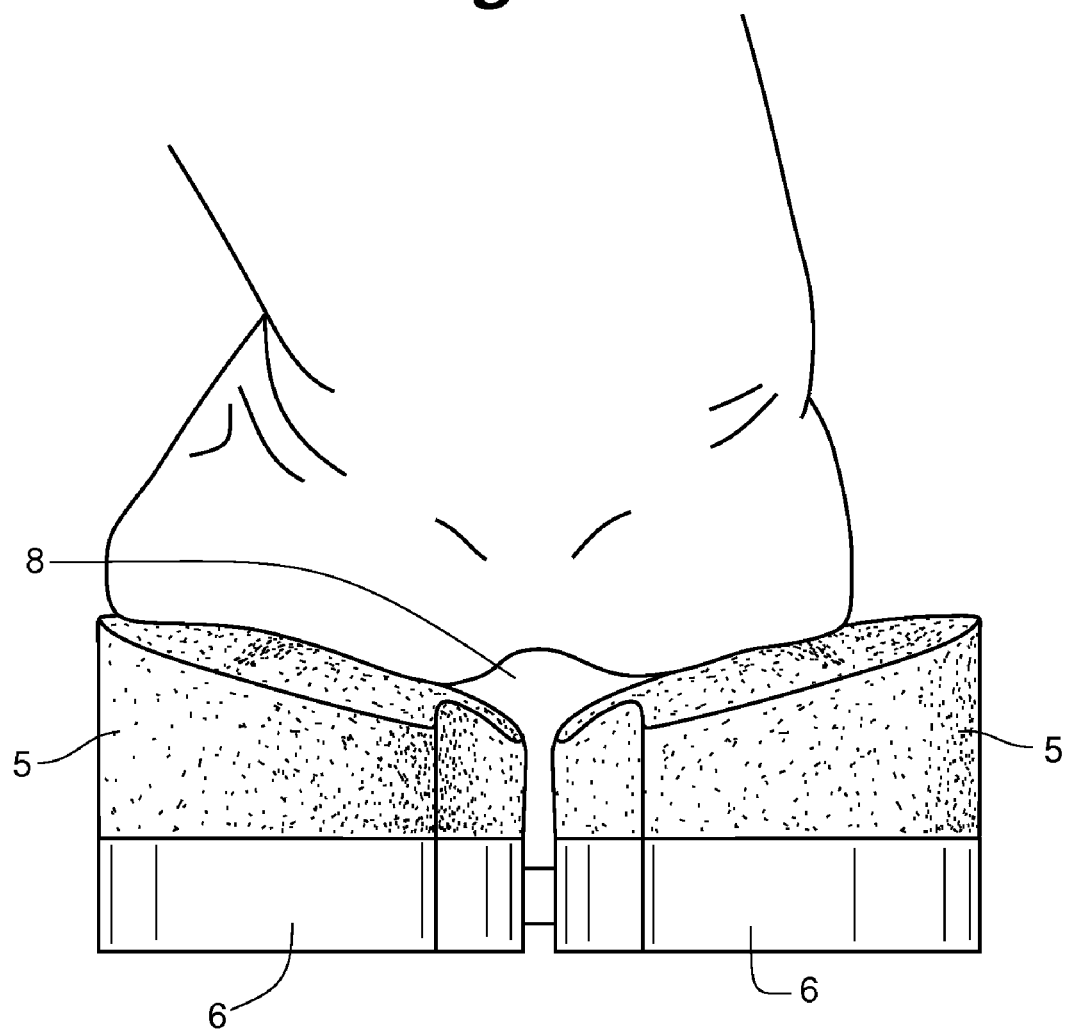
FIG. 5 illustrates a backside view of a user's hand on the mouse accoutrement of the present invention.

FIG. 5 depicts a backside view of a user's hand placed on accoutrement 4. The palm of the user's hand rests on cushions 5 of accoutrement 4. The cushions 5 are designed to prevent the carpal tunnel of the user's palm from making any contact with the mouse. Moreover, the crevice 8 between the cushions 5 assists in ensuring that the carpal tunnel is left substantially open. Hence, the shape of the cushions 4, the shape of the palm and the presence of the crevice 8 are responsible for keeping the carpal tunnel open.

Figure 6:
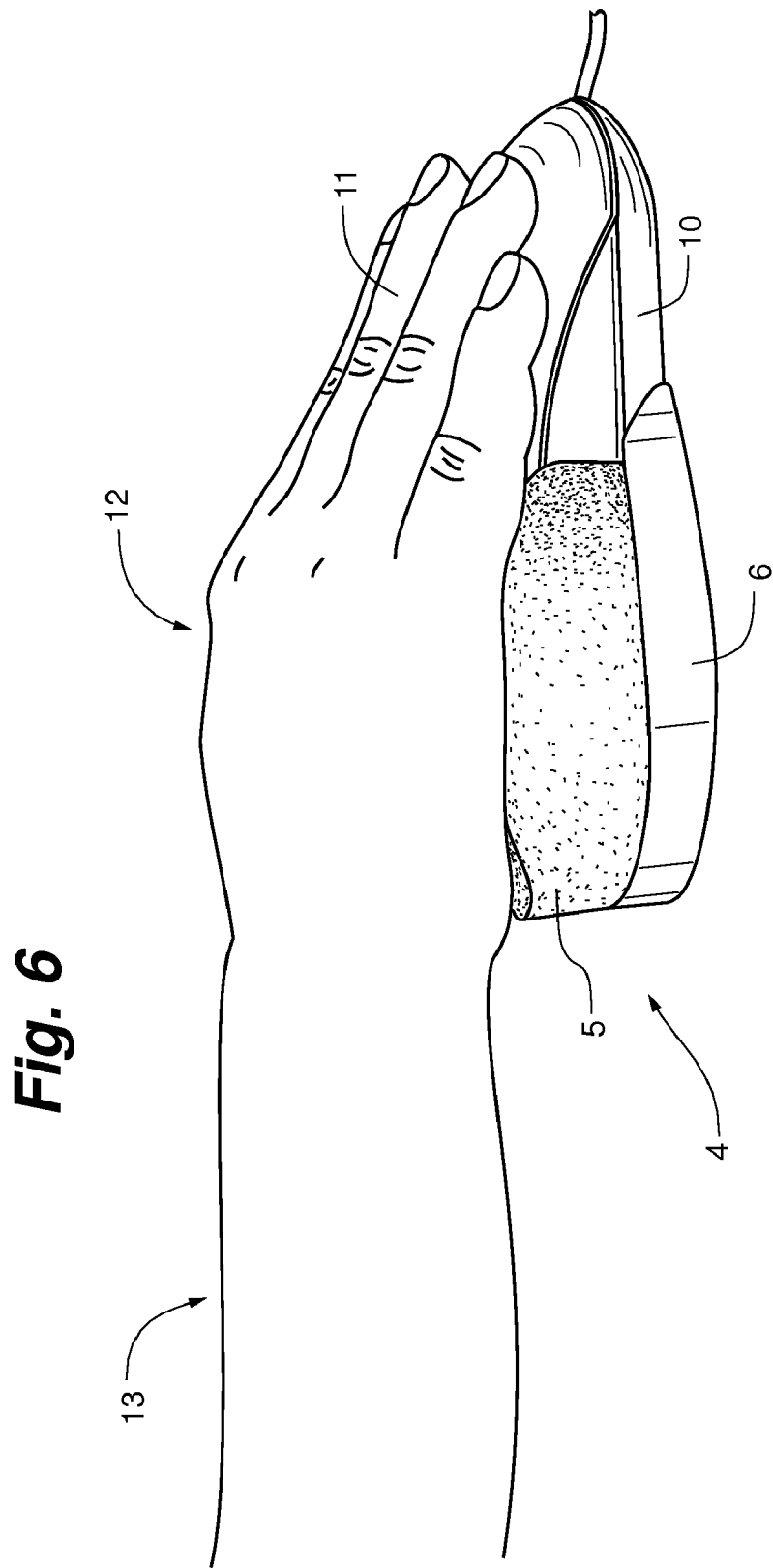
FIG. 6 illustrates a view of the mouse accoutrement of the present invention with attached mouse when in use.

FIG. 6 illustrates a view of accoutrement 4 with attached mouse 10 when in use. The relationship between the user's hand 12, fingers 11 and arm 13 are indicated in the diagram. The receptacles 6 holding cushions 5 are sized to essentially accommodate the palm of the user's hand. When the palm is placed on the cushions 5 of accoutrement 4, the fingers 11 have direct access to the front of mouse 10. This configuration allows for easy manipulation of the cursor. Moreover, the design of accoutrement 4 ensures a straight path between the arm, elbow and wrist of the user, hence mitigating the effects of wrist bend. Additionally, the configuration provides comfort to the user.

Figure 7:
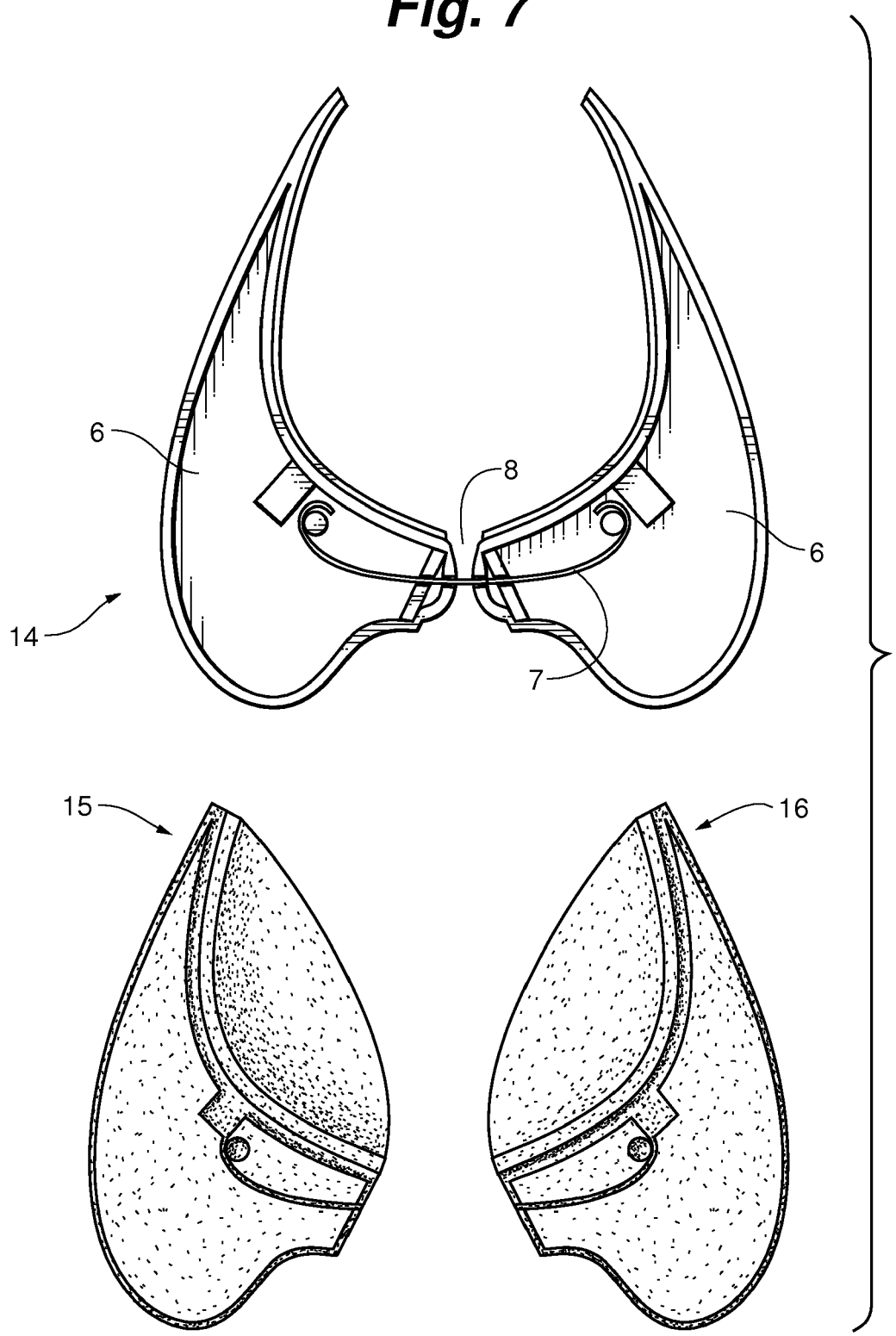
FIG. 7 illustrates a view of the receptacle and cushions of the mouse accoutrement of the present invention.

The accoutrement of the present invention may be manufactured as a single piece, with cushions and receptacles preassembled. Alternatively, the cushions and receptacles may be manufactured as separate pieces which are easily assembled by the user prior to use. FIG. 7 illustrates the embodiment where the receptacle and cushions are manufactured as separate components. In FIG. 7, the full receptacle 14 is composed of individual receptacle units 6 which are held together by spring 7 at the thorax. A crevice 8 is situated in between the two receptacle units 6. The spring 7 allows for a range of flexible motion between the individual receptacle units 6, which enables the full receptacle to accommodate different input devices. Full receptacle 14, as shown in FIG. 7, is designed to accommodate the shape of most commercialized computer mouses. The other units displayed in FIG. 7 are left cushion 15 and right cushion 16. The individual cushions have an identical shape, at their bottoms, to individual receptacle units 6. Hence, the user can simply place the cushions into the receptacle units. Alternatively, if need be, the cushions can be removed from the individual receptacle units. The inner wall of the receptacle 14 may be lined with a material that facilitates placing or removing the cushions from the receptacles. In one embodiment, the inner wall of the receptacle may be lined with a felt or felt-like material.

Figure 8A:
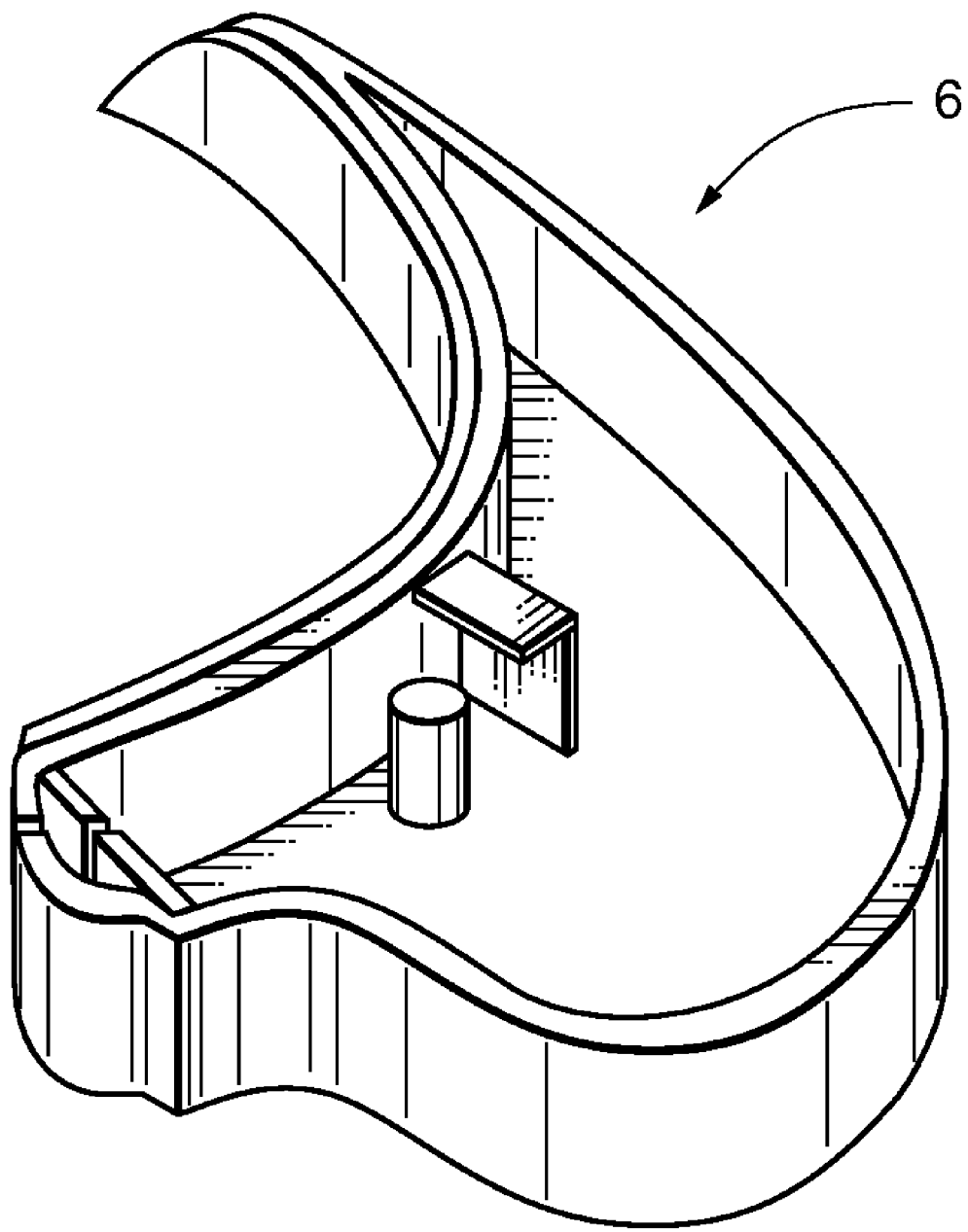
FIG. 8A illustrates a view of the right receptacle of the mouse accoutrement of the present invention.

Next, turning to the individual components of accoutrement of the present invention, FIG. 8A shows a preferred embodiment of the left receptacle unit 6. The shape and size of the left receptacle 6 is designed to approximate the size of the right hand portion of the human palm. Hence, when left receptacle and right receptacle are assembled together as shown in FIG. 7, the assemblage approximates the full size of the human palm.

Figure 8B:
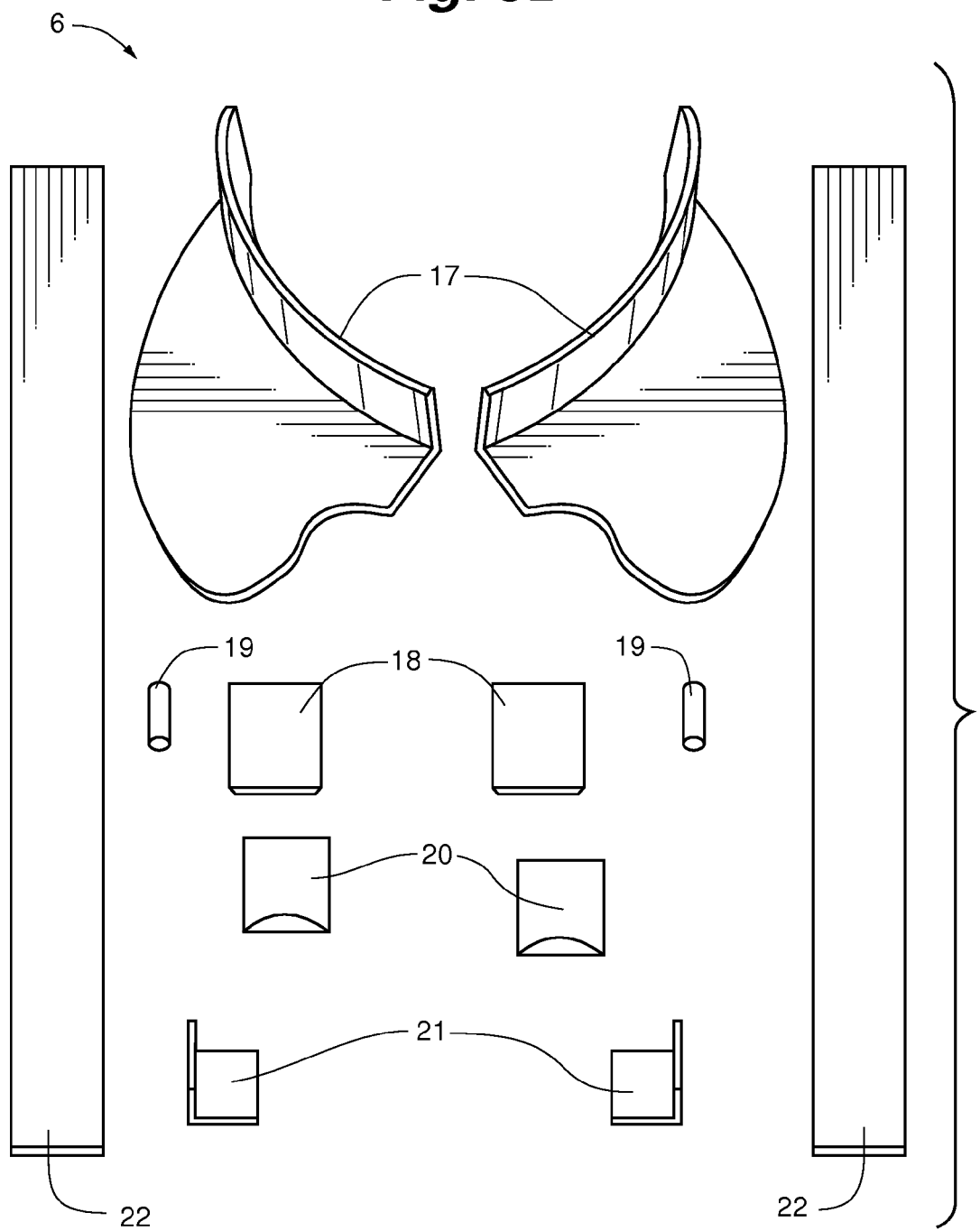
FIG. 8B illustrates a view of the component parts that comprise the receptacle of the mouse accoutrement of the present invention.

FIG. 8B illustrates a breakdown of components used in the manufacture of the receptacle units. Each receptacle unit 6 is composed of a base 17, a first end piece 18, an anchor 19, a second end piece 20 and a partition for the anchor of the spring 21 that will connect the left and right receptacle units. The inner wall 22 of the receptacle may be lined with a felt material. Anchor 19 is a plastic post glued to the base 17 and positioned to secure the end of the spring and to prevent the base from opening too wide. End piece 18 is a plastic short wall glued to the base 17 and walls 22 to secure the walls. Second end piece 20 is a plastic short curved wall glued to the end piece 18 to allow easy movement of the walls. Anchor 21 is preferably cut out of ABS plastic and glued with epoxy to the base and curve of the wall to act as a stopper for the end of the spring (See FIG. 9A). The wall may be cut out and formed from ABS plastic and then is bent to conform to the shape of the outside of the base and glued with epoxy. A grooved rubber piece about $\frac{1}{16}$" thick is glued to the inside of the walls 22 to the exact dimensions of the wall resulting in the walls gripping the sides of the mouse in a pincer-like grasp. With these components installed, the receptacle is complete and ready for the insertion of the cushion.

Figure 9A:
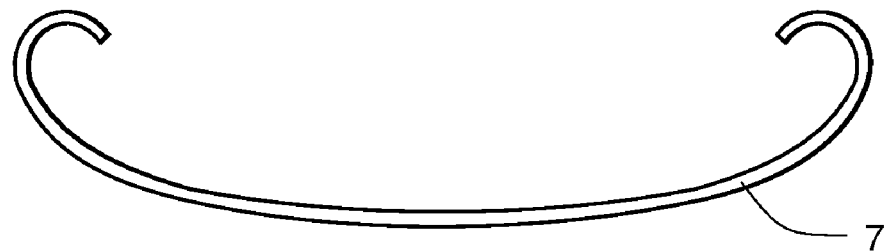
FIG. 9A illustrates an overhead view of the spring that attaches the receptacle units of the mouse accoutrement of the present invention.
Figure 9B:
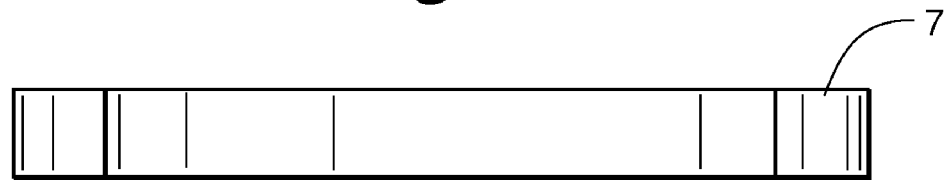
FIG. 9B illustrates a front view of the spring that attaches the receptacle units of the mouse accoutrement of the present invention.
Figure 9C:
FIG. 9C illustrates a back view of the spring that attaches the receptacle units of the mouse accoutrement of the present invention.

Receptacle 6 in FIGS. 8A and 8B is preferentially made from a plastic material. In one preferred embodiment, the receptacle is made from ABS (acrylonitrile butadiene styrene) plastic. On the bottom of the receptacle are six Teflon pieces glued with contact cement to allow for easy movement on a surface. The right and left receptacles are connected with one flat metal spring 7. The preferred shape of the spring is illustrated in FIGS. 9A-C, which show an overhead, front and back view of spring 7, respectively. At each end of the spring is a slot (two walls) where the curled end of the spring is held by being secured in the slot. A wall of approximately $\frac{3}{8}$ths of an inch high made of ABS plastic is glued with epoxy on the outside base of the receptacle. The wall is extended at the end of the base to grip the mouse. On the end of inside wall is an end piece which is a half round piece of ABS plastic which is glued with epoxy to allow easy fitting by the receptacle to the mouse. Each piece has a cut slot for the spring installation from one receptacle to the other receptacle. The inside of each wall may then be glued with contact cement and etched thin rubber with the same dimensions of the wall to prevent the grippers from sliding. The end of the outside wall ends in a downward point causing pincers which grasp and hold the mouse.

Figure 10A:
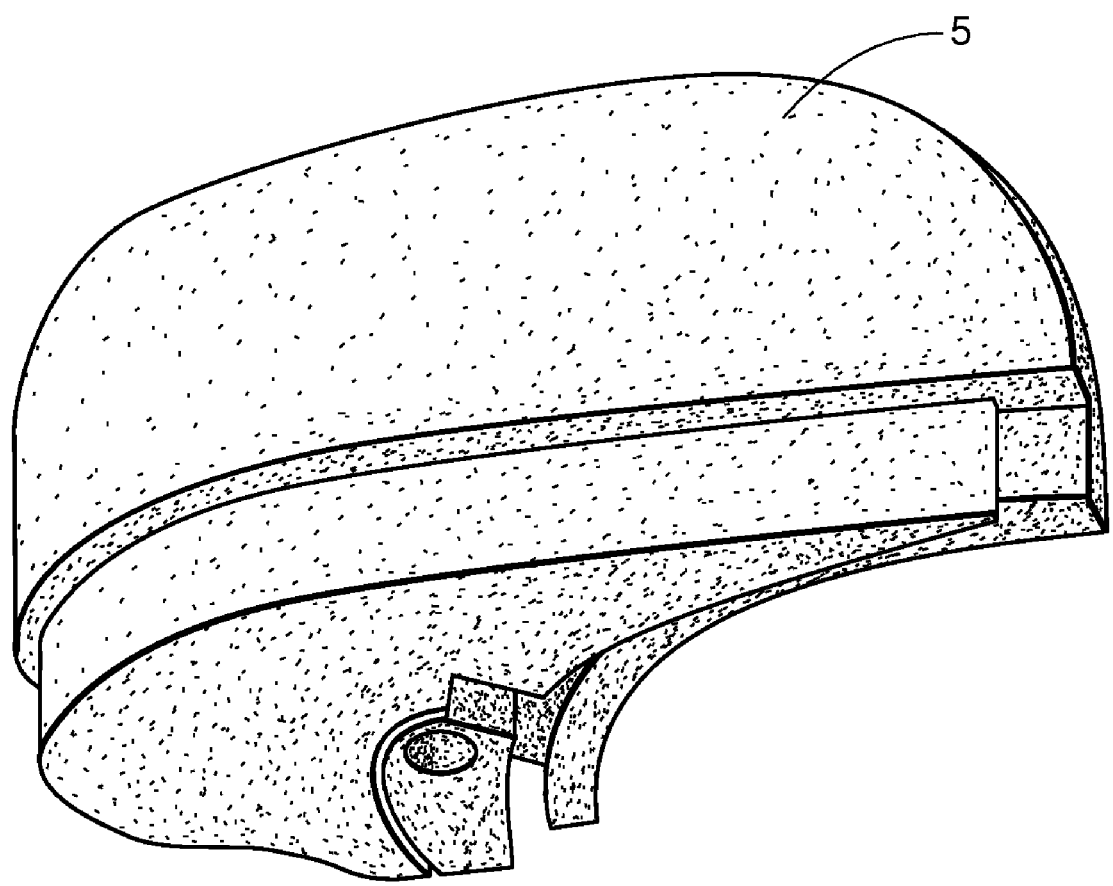
FIG. 10A illustrates a side angle of the right cushion of the mouse accoutrement of the present invention.
Figure 10B:
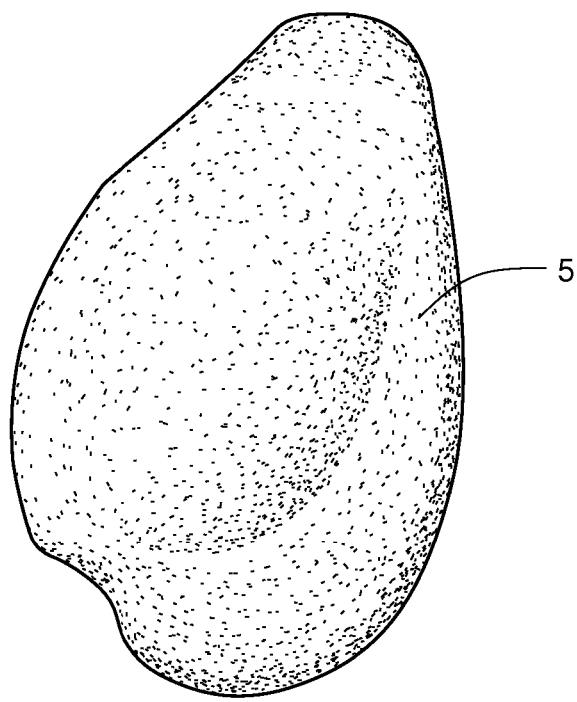
FIG. 10B illustrates a top view of the right cushion of the mouse accoutrement of the present invention.
Figure 10C:
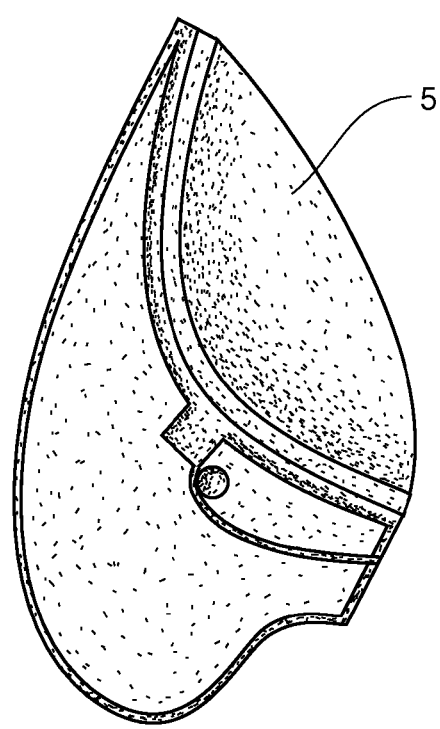
FIG. 10C illustrates an upside-down view of the right cushion of the mouse accoutrement of the present invention.

FIGS. 10A-C illustrate a preferred embodiment of the cushions of the mouse accoutrement of the present invention. FIG. 10A depicts a side view of right cushion 5. FIG. 10B depicts a top view of right cushion 5. FIG. 10C depicts a bottom view of right cushion 5. The cushions are preferably made from natural rubber or polyethylene foam, and most preferably, from natural rubber. The bottom of cushion 5 (FIG. 10C) is shaped so that it can be placed perfectly into the right receptacle (FIG. 8A). The bottom of each cushion is a cut slot which is comparable to the edge of the spring, thus allowing the cushions to be fitted into the slots of the receptacle. In a preferred embodiment, the upper portion of cushion 5 has a shape that resembles the three-dimensional anatomy of the human palm. Unlike a traditional mouse, which has a curvilinear or arched upper portion, the upper portion of cushion 5 has a topography that resembles the human palm. A mold of the human palm is preferably made from play dough. After it dries the depressions of the cheeks of the palm are matched with cushions of natural rubber. The natural rubber cushions are formed by working with electric diamond cutting flywheels and burs forming a cushion which fits snugly into the mold of the cheeks of the palm. Both cushions which fit the depression of the cheeks of the palm are then cut to fit into the receptacle FIG. 8. The shape of the cushion derived from the mold is the top of the cushion. Both cushions are shaped to maintain the natural space between the cheeks and keeps the top of the hand level while the tips of the fingers are lower than the bottom of the cheeks. In this position the natural space between the cheeks of the palm is maintained.

Figure 11:
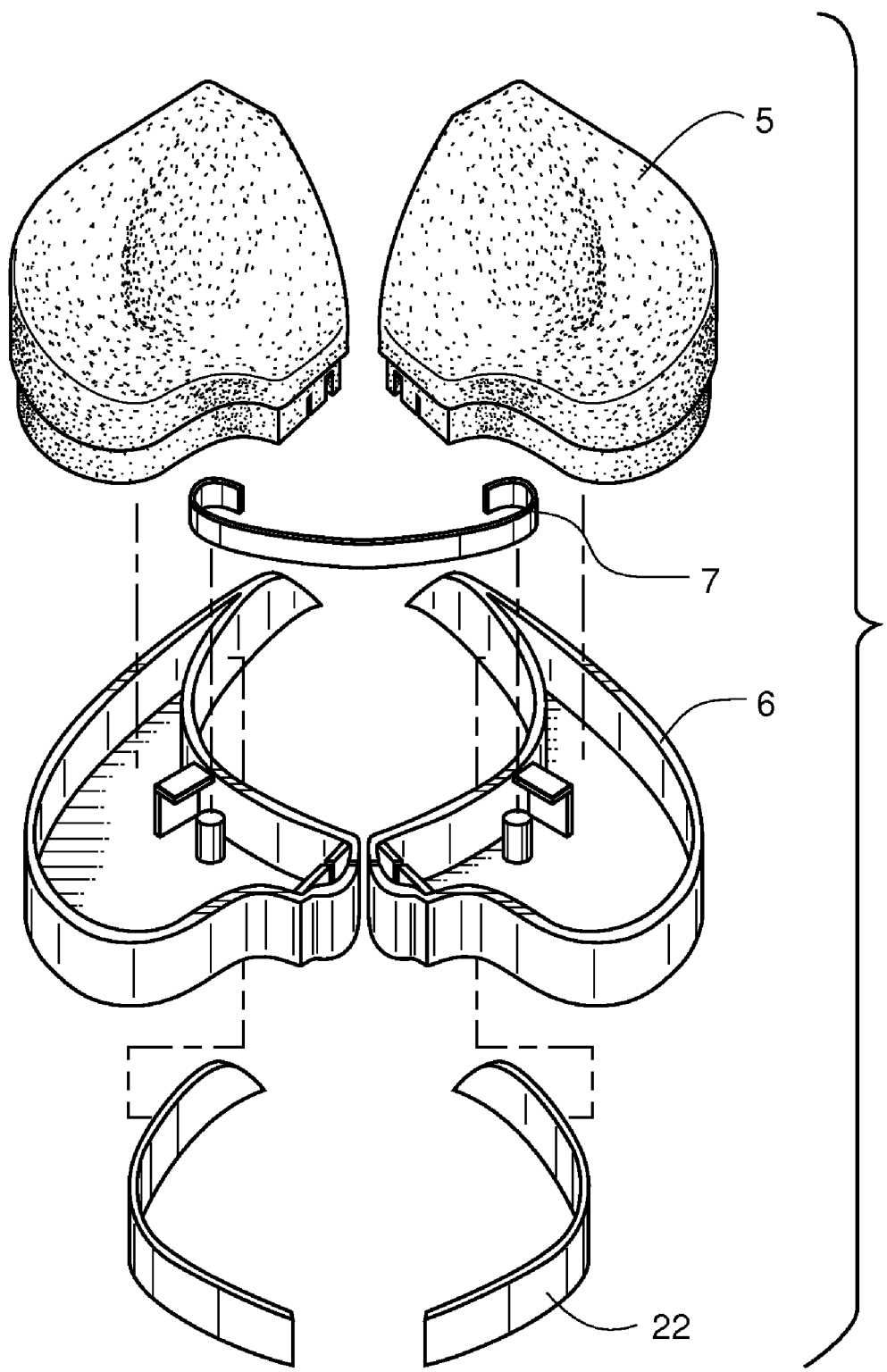
FIG. 11 illustrates the individual parts comprising the accoutrement of the present invention.

FIG. 11 depicts a preferred embodiment of the accoutrement of the present invention. As discussed above, the properly shaped cushions 5 are designed to perfectly fill the space of the receptacles 6. Spring 7 attaches the left and right receptacle units, thus allowing for flexible movement between them. A grooved rubber piece (22) approximately $\frac{1}{16}$" thick is glued to the inside of the walls of 6 to the exact dimensions of the wall, resulting in the walls gripping the sides of the mouse.

The height of the cushion will vary depending upon the comfort and size of the hand and cheeks of the palm. In a preferred embodiment, the height of the cushion is between 0.75 inches and 2 inches. In a more preferred embodiment, the height of the cushion is between 1.25 inches and 1.75 inches. To accommodate very large hands, the mouse accoutrement of the present invention may have an attachment to the bottom of the receptacle.

Figure 12A:
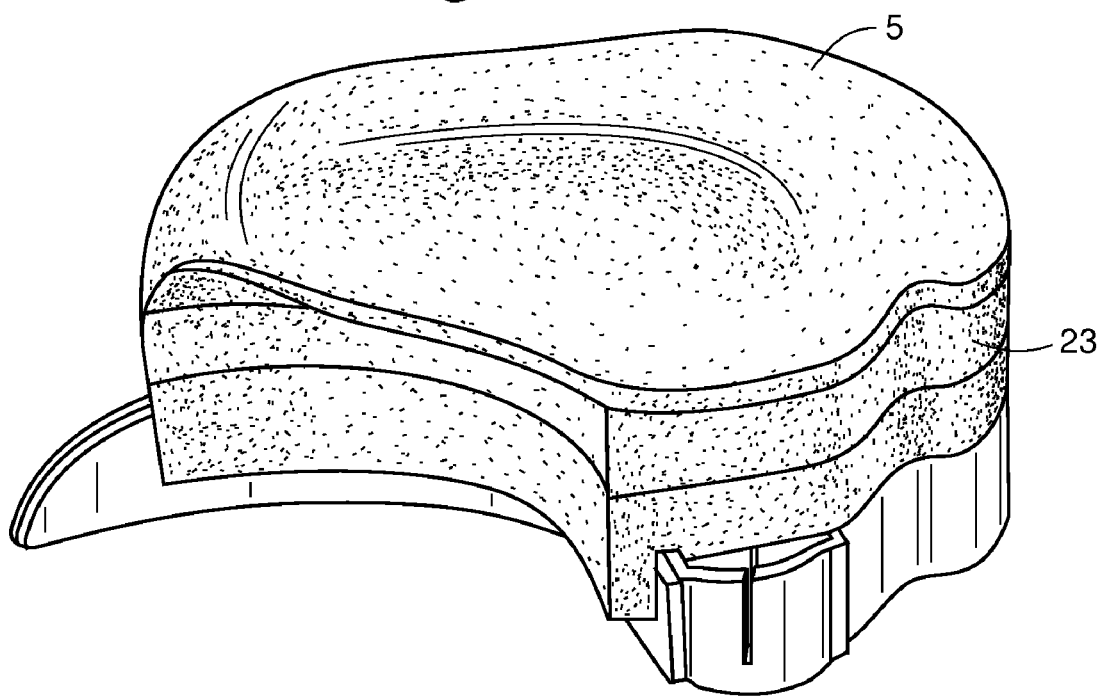
FIG. 12A illustrates the inside view of the mouse accoutrement with a straight level inserted in the middle of the cushion.
Figure 12B:
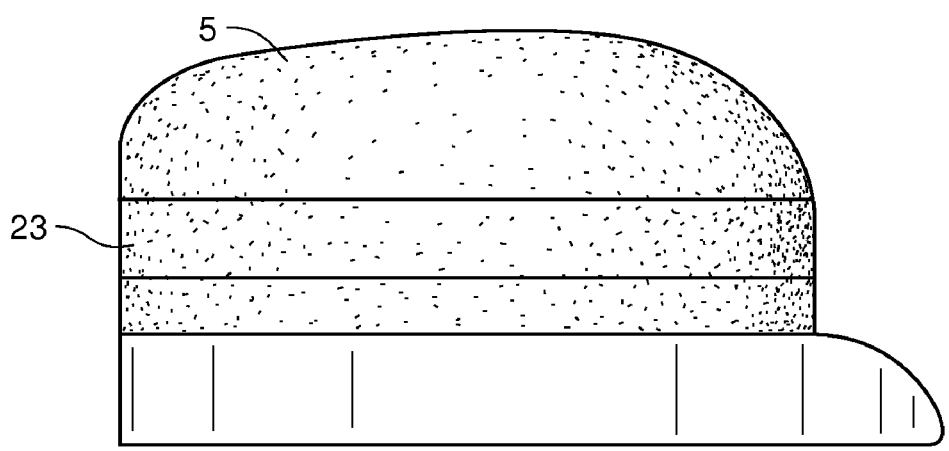
FIG. 12B illustrates the outside view of the mouse accoutrement with a straight level inserted in the middle of the cushion.

In some cases, the users palm cheek below the thumb is thicker than the palm cheek below the pinky finger. For this reason, the height of the cushion must be comfortable and the top of the hand below the fingers must be level. By adding or removing a level to the cushion, the user can accomplish a level palm surface resulting in obtaining the maximum space for the carpal tunnel and a comfortable seat for the hand when working with a mouse. The straight level can be inserted into either the right cushion or the left cushion. FIGS. 12A and 12B illustrate an inside view and an outside view of an embodiment where a level 23 is inserted into cushion 5. In this embodiment, the cushions 5 are designed such that levels 23 can be easily inserted and removed if required. The level ensures that that the height of the cushion can be raised, without limitation, to accommodate the differences in structure of the hand to ensure that the hand is horizontal and undistorted when resting on the cushion. Adding or removing levels does not change the space required by the carpal tunnel.

Figure 12C:
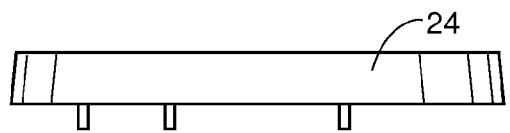
FIG. 12C illustrates anchors used to hold the level to the cushion.
Figure 12D:
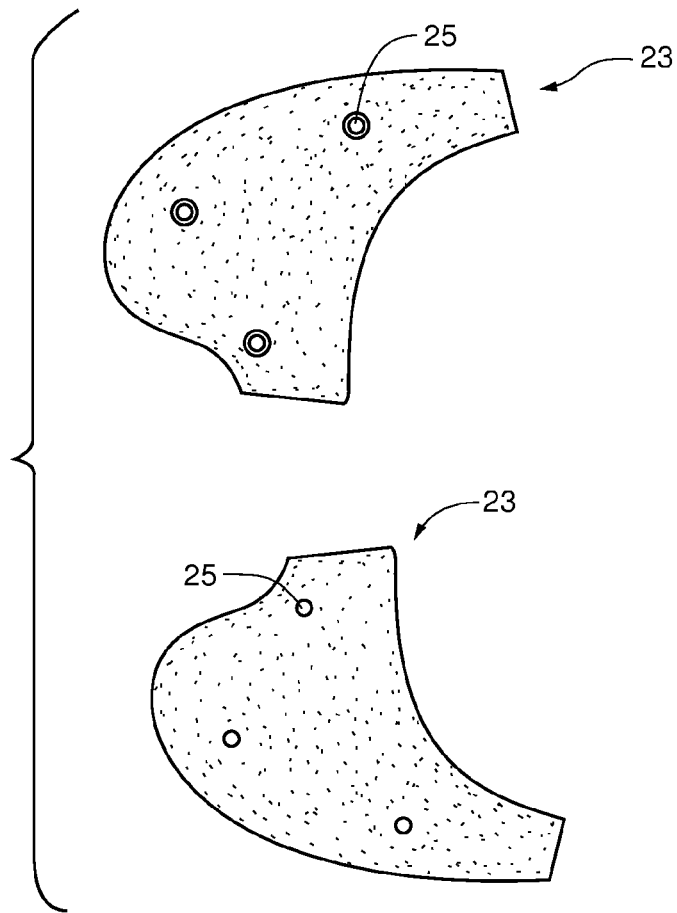
FIG. 12D illustrates a top and bottom view of the level which is installed in the mouse accoutrement.
Figure 12E:
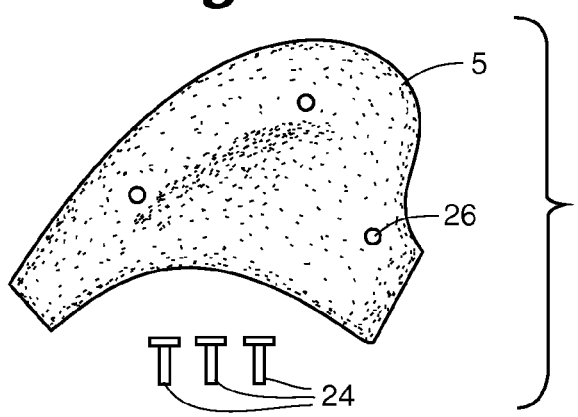
FIG. 12E illustrates the anchors which are inserted in the level and the slots on the cushion which receive the anchors stabilizing the level to the cushion.

An undistorted level can be accomplished in several different ways. In a preferred embodiment, as depicted in FIGS. 12C and 12D, the levels can then be held to the cushion using an anchor 24. To accomplish this, slots 25 are inserted into level 23 (FIG. 12D). The slots are designed to perfectly accommodate one end of an anchor 24. The other end of the anchor is inserted into corresponding slots on the cushion, thus fixating the level in place. FIG. 12E illustrates that holes 26 are inserted into the cushion 5 to accommodate one end of anchor 24. When a level is inserted, the top of the cushions' anchors will fit into the slots 25 on the top of the level 23 where the other end of the anchor will fit into holes 26 of the cushion. To ensure a consistent series of holes allowing each anchor 24 to match each hole 25 without any variation, the holes 25 are drilled from the bottom of the cushion (5b in FIG. 13), through the level (23 in FIG. 13) to the bottom section of the top cushion (5a in FIG. 13).

To accommodate the levels, it may be necessary to create an opening in the cushion. This can be accomplished, for instance, by slicing the cushion at a location between its upper end and its lower end. The level, which is preferably made from the same material as the cushion, is then conveniently placed between the top of the sliced cushion and the bottom of the sliced cushion.

Figure 13:
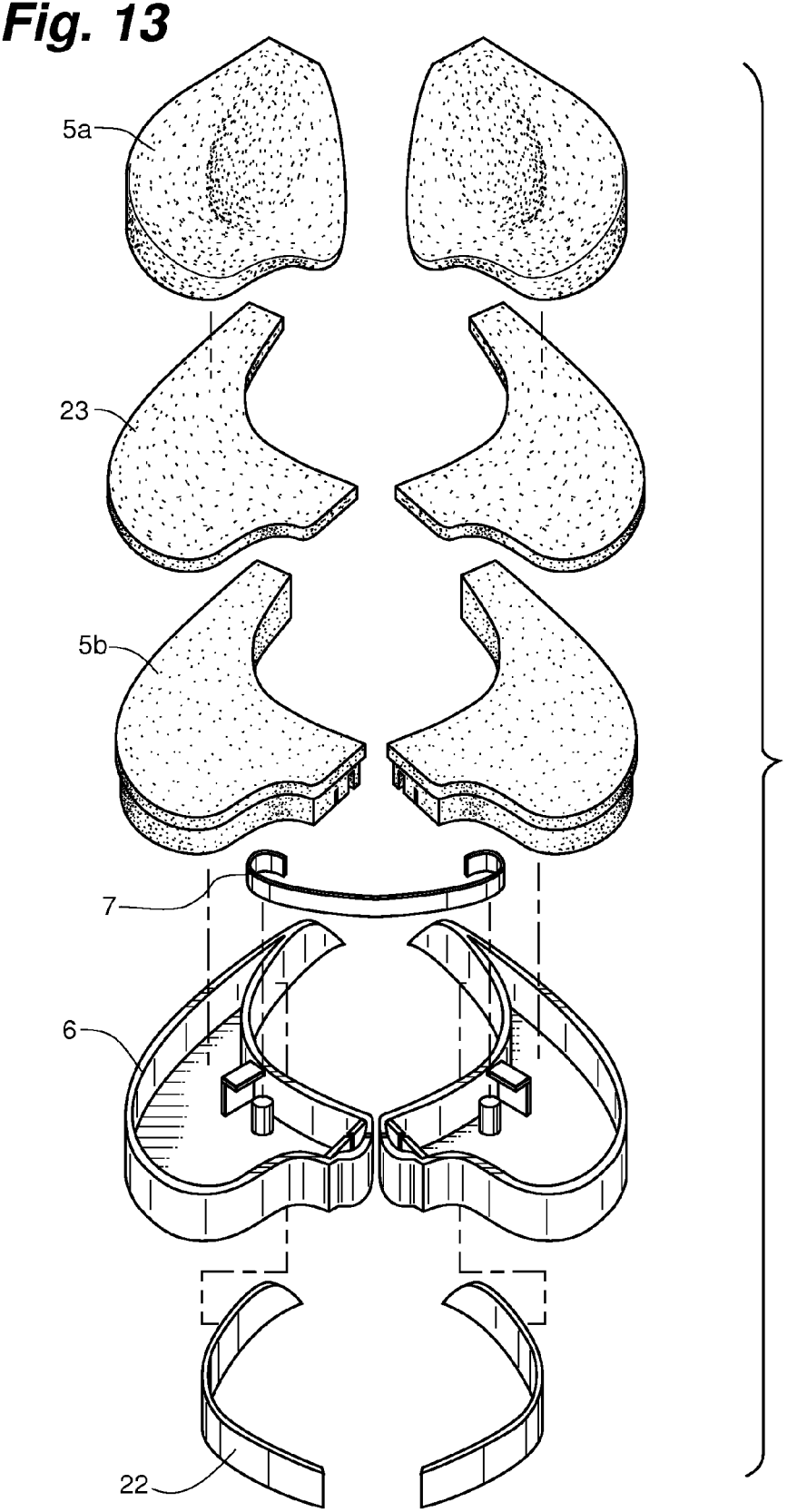
FIG. 13 illustrates individual parts comprising the accoutrement of the present invention with added levels.

FIG. 13 illustrates individual parts comprising the accoutrement of the present invention with added levels. In FIG. 13, cushion 5 is divided into two separate pieces, an upper piece 5a, and a lower piece, 5b, to emphasize that the cushion must be sliced in order to accommodate level 23. Hence, cushion 5 is preferably made out of a single piece. However, in an alternative embodiment, the cushion can be made from separate pieces, a top piece and a bottom piece.

The mouse accoutrement of the present invention is simply made and does not require any additional attachments or adjustments. It surrounds the mouse and is held tight by the spring mechanism. The cushions of the invention are designed to emulate the shape of the human palm. This allows space for the carpal tunnel and maintains that space when using the mouse.

While the preferred embodiments have been illustrated above, it will be apparent to those of ordinary skill in the art that many modifications may be made without departing from the concepts sets forth herein.

The invention claimed is:

1. An attachment to a computer mouse, comprising:
   a left cushion and a right cushion, the cushions configured to be shaped in a form of a human palm, wherein the left cushion and the right cushion are sized to maintain a crevice there between; and
   a receptacle having two units attached by a spring, the receptacle units adapted to hold the mouse, wherein the mouse slides into the receptacle units such that the mouse is between and underneath the cushions.

2. The attachment of claim 1, wherein the left cushion and the right cushion are composed of natural rubber.

3. The attachment of claim 1, wherein the receptacle is composed of acrylonitrile butadiene styrene plastic.

4. The attachment of claim 1, wherein said crevice is aligned with a carpal tunnel of a user of said mouse.

5. The attachment of claim 1, wherein a height of said cushions is between 0.75 inches and 2 inches.

6. The attachment of claim 1, wherein a height of said cushions is between about 1.25 inches and about 1.5 inches.

7. The attachment of claim 1, further comprising a straight level adapted to be inserted into the left cushion or the right cushion.

8. An apparatus for reducing stress and posture related disorders associated with use of a computer mouse, comprising:
   a palm support, including a left cushion and a right cushion, wherein the cushions collectively form a shape of a human palm; and
   a container for holding the left cushion and the right cushion, wherein the mouse slides into the container such that the mouse is between and underneath the cushions.

9. The apparatus of claim 8, wherein said left cushion and said right cushion when fully assembled contain a crevice there between.

10. The apparatus of claim 9, wherein said crevice is sized from about three eighths of an inch to about seven eighths of an inch.

11. The apparatus of claim 8, wherein the left cushion and the right cushion are composed of natural rubber.

12. The apparatus of claim 8, wherein the container is composed of acrylonitrile butadiene styrene plastic.

13. The apparatus of claim 9, wherein the crevice is aligned with a carpal tunnel of a user of the mouse.

14. The apparatus of claim 8, wherein a height of the cushions is between 0.75 inches and 2 inches.

15. The apparatus of claim 8, wherein a height of the cushions is between about 1.25 inches and about 1.5 inches.

16. The apparatus of claim 8, further comprising a straight level adapted to be inserted into the left cushion or the right cushion.

17. The attachment of claim 1, wherein the crevice is sized from about three eighths of an inch to about seven eighths of an inch.

* * * * *